United States Patent
Colignon

(10) Patent No.: US 7,765,796 B2
(45) Date of Patent: *Aug. 3, 2010

(54) SYSTEM FOR ASSISTING THE REGENERATION OF DEPOLLUTION MEANS FOR A MOTOR VEHICLE ENGINE

(75) Inventor: Christophe Colignon, Levallois Perret (FR)

(73) Assignee: Peugeot Citroen Automobiles SA, Velizy Vukkacoublay (FR)

( * ) Notice: Subject to any disclaimer, the term of this patent is extended or adjusted under 35 U.S.C. 154(b) by 819 days.

This patent is subject to a terminal disclaimer.

(21) Appl. No.: 11/571,258

(22) PCT Filed: Jun. 21, 2005

(86) PCT No.: PCT/FR2005/050472

§ 371 (c)(1),
(2), (4) Date: Dec. 22, 2006

(87) PCT Pub. No.: WO2006/005872

PCT Pub. Date: Jan. 19, 2006

(65) Prior Publication Data

US 2008/0066445 A1   Mar. 20, 2008

(30) Foreign Application Priority Data

Jun. 23, 2004  (FR) ................... 04 06863

(51) Int. Cl.
*F01N 3/00*  (2006.01)

(52) U.S. Cl. ............... 60/285; 60/284; 60/286; 60/299; 60/301

(58) Field of Classification Search ........... 60/285, 60/286
See application file for complete search history.

(56) References Cited

U.S. PATENT DOCUMENTS

| 6,325,041 | B1 | 12/2001 | Mamiya et al. |
| 7,017,337 | B2 * | 3/2006 | Plote et al. ............... 60/295 |
| 7,493,755 | B2 * | 2/2009 | Colignon ............... 60/295 |
| 2004/0055825 | A1 | 3/2004 | Fuerst et al. |

FOREIGN PATENT DOCUMENTS

| EP | 1041262 A | 10/2000 |
| EP | 1386656 A | 2/2004 |
| EP | 1405999 A | 4/2004 |

* cited by examiner

*Primary Examiner*—Thomas E Denion
*Assistant Examiner*—Jesse Bogue
(74) *Attorney, Agent, or Firm*—Nicolas E. Seckel

(57) ABSTRACT

The inventive system for assisting in the regeneration of depollution means (1) which is integrated in the exhaust means (3) of a diesel engine (4), wherein the engine (4) is associated with a common rail supplying means (7, 8) for injecting fuel into cylinders thereof using at least one post-injection and for carrying out at least two regeneration strategies by isotorque modifying the parameters of the engine operation control, wherein the first regeneration strategy comprises a first level strategy and a second level strategy and the second regeneration strategy comprising the first level strategies and a sequence alternating the second and second over-calibrated level strategies, thereby making it possible to obtain different thermal levels in the line. The inventive system is characterised in that it comprises means (8) for determining the frequency of regenerations of the depollution means and means (8) for comparing said frequency with the threshold values in order to carry out the first regeneration strategy for the frequencies lower than said threshold values or the second strategy for the frequencies greater than the threshold values.

20 Claims, 2 Drawing Sheets

Figure 1:
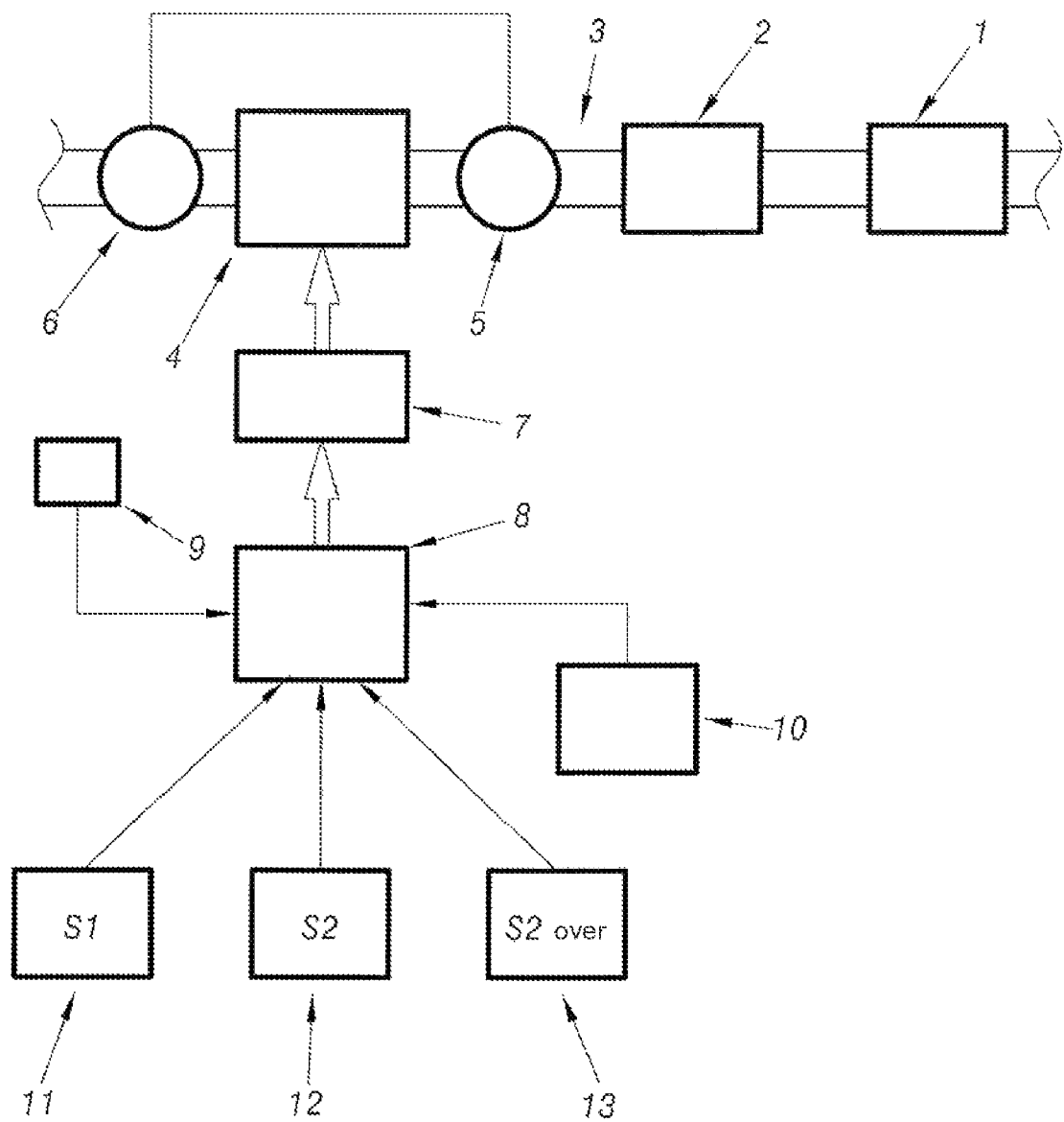

SYSTEM FOR ASSISTING THE REGENERATION OF DEPOLLUTION MEANS FOR A MOTOR VEHICLE ENGINE

The present invention concerns a system for assisting the regeneration of depollution means integrated in an exhaust line of a motor vehicle diesel engine.

More particularly, the invention concerns such a system in which the engine is associated to common rail means for the supply of fuel to its cylinders, according to at least one post-injection.

Such a post-injection is, in a standard manner, an injection of fuel after the high dead center of the cylinder under consideration.

These supply means are adapted to implement, in iso-couple, through modification of parameters for controlling the operation of the engine, different regeneration strategies that make it possible to obtain different thermal states in the exhaust line.

Thus, for example, supply means implementing a first regeneration strategy according to a strategy called level 1 strategy and a second regeneration strategy according to a strategy called level 2 strategy and/or an over-calibrated level 2 strategy, have already been proposed.

Indeed, it is known that, to ensure the regeneration of depollution means such as a particle filter, the soot trapped therein is burned thanks to the thermal energy provided by the engine and to the exotherm obtained by the conversion of the HC and of the CO on means forming an oxidation catalyst placed, for example, upstream of the particle filter.

This combustion can be assisted by a catalyzing element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

However, in critical driving conditions, such as, for example, city driving or in traffic jams, the levels reached with standard regeneration strategies of the particle filter can become insufficient to ensure a correct regeneration of the filter, which can translate into regenerations that last very long and are thus highly fuel-consuming, or even incomplete.

Any strategy for the elevation of the thermal levels during those critical driving conditions makes it thus possible to ensure complete regenerations, to reduce the over-consumption caused by this regeneration of the particle filter, and above all, to increase the security margin with respect to the cracking or the breakage of these filters.

The objective of the present invention is to propose such a strategy.

To this effect, an object of the invention is a system for assisting the regeneration of depollution means integrated in an exhaust line of a motor vehicle diesel engine, in which the engine is associated with common rail supply means for the injection of fuel into the cylinders thereof, according to at least one post-injection, and adapted to implement, in iso-couple, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and an over-calibrated level 2 strategy, making it possible to obtain different thermal levels in the exhaust line, characterized in that it comprises means for determining the regeneration frequency of the depollution means and means for comparing this frequency with predetermined threshold values, to implement the first regeneration strategy for frequencies under the threshold values or the second strategy for frequencies above the threshold values.

According to other characteristics:
the depollution means comprise a particle filter;
the particle filter is catalyzed;
the depollution means comprise an NOx trap;
the fuel comprises an additive intended to be deposited, with the particles with which it is mixed, on the depollution means to facilitate their regeneration;
the depollution means are impregnated with an SCR formulation, ensuring a CO/HC oxidation function;
the fuel comprises an additive forming NOx trap,
the engine is associated with a turbo-compressor; and
the regeneration frequency of the depollution means is determined from the five last regeneration attempts thereof.

Figure 2:
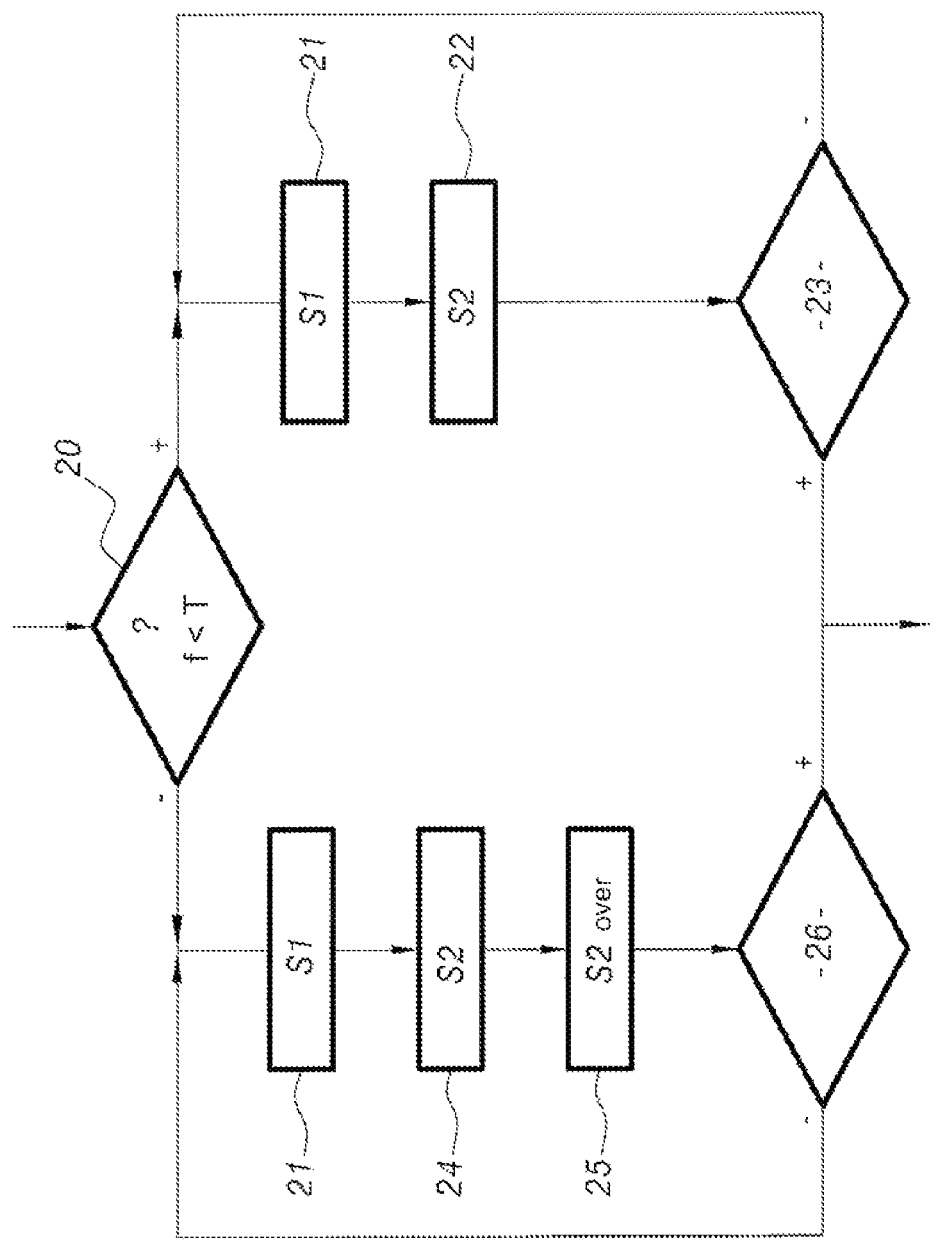

The invention will be better understood by reading the following description given as an example only and made in reference to the annexed drawings, in which:

FIG. 1 is a synoptic schematic view illustrating the structure of an assistance system according to the invention; and FIG. 2 illustrates the operation thereof.

Indeed, FIG. 1 shows a system for assisting the regeneration of depollution means designated by the general reference 1, associated with means forming oxidation catalyst, designated by the general reference 2 and placed in an exhaust line 3 of a thermal engine such as a motor vehicle diesel engine.

This engine is designated by the general reference 4 and can be associated, for example, with a turbo-compressor whose turbine portion 5 is associated with the exhaust line and whose compressor portion 6 is placed upstream of the engine.

The engine is associated with common rail means for the supply of fuel to the cylinders thereof, designated by the general reference 7, whose operation is controlled by a supervisor 8.

According to the invention, this system also comprises means for determining the regeneration frequency of the depollution means and means for comparing this frequency with predetermined threshold values, to control the operation of the engine.

The comparison means formed, for example, by the supervisor 8, are then connected to means for determining this frequency, designated by the general reference 9, supplying this frequency to the supervisor 8, so as to enable the latter to compare it to threshold values such as supplied by generation means 10 comprising any appropriate means making it possible to establish these threshold values.

The determination of the regeneration frequency of the depollution means is indeed important.

This frequency is determined from the average distance traveled, for example, between the five last regenerations, by calculation taking into account the five last attempts at regeneration or activation of the request for regeneration assistance which has resulted in a regeneration balance.

This calculation is based on the mileage at the beginning of the requests for regeneration assistance.

To avoid too frequent regenerations, the mileage between each regeneration for the five regenerations thus is recorded, for example, in a memory of the E-EPROM type.

From these five values, it is then possible to calculate a mileage average of regeneration to determined this regeneration frequency.

Of course, other embodiments can be envisioned.

This number thus determined is subsequently compared to threshold values to determine the optimal strategy to be applied.

In fact, the supervisor and the common rail means for the fuel supply are adapted to drive the engine according to different regeneration strategies which make it possible to obtain different thermal levels in the exhaust line, and in particular, a first regeneration strategy comprising level 1 strategies, S1, as designated by the general reference 11 on this FIG. 1, and level 2 strategies, S2, as designated by the reference 12 on this Figure, and a second regeneration strategy comprising level 1 strategies, S1, and a sequence alternating level 2 strategies, S2, and over-calibrated level 2 strategies, S2 over, as designated by the general reference 13 on this Figure.

In fact, in the system according to the invention, and as a function of the results of the comparison performed by the means for comparing the frequency to predetermined threshold values, a regeneration strategy is implemented according to a level 1 and level 2 operation mode for frequencies lower than the predetermined threshold values (average distance between regenerations higher than a threshold value), and according to a level 1 operation mode associated with a sequence alternating level 2 and over-calibrated level 2 operation modes, for frequencies higher than the predetermined threshold levels (average distance between regenerations lower than the threshold value).

This makes it thus possible to maximize the chances of success of the regeneration, in particular in critical driving conditions, such as, for example, city driving or in traffic jams.

By way of example, one can go from the following criteria for a standard level 2 calibration for assisting the regeneration of a particle filter:

maximal exhaust collector temperature=800° C.
maximal catalyst exotherm=150° C.
maximal catalyst outlet temperature=710° C.
maximal catalyst internal temperature=760° C.
minimal oxygen content of the gases at catalyst outlet=3% to the following criteria for an over-calibrated level 2 strategy:

maximal exhaust collector temperature=830° C.
maximal catalyst exotherm=200° C.
maximal catalyst outlet temperature=730° C.
maximal catalyst internal temperature=no maximal value
minimal oxygen content of the gases at catalyst outlet=2%
With the following results:

| | |
|---|---|
| EUDC cycles | temperature at PF inlet of 600° C. reached in 200 sec. instead of 600 sec. with standard RG |
| | temperature at PF inlet of 650° C. reached in 220 sec. whereas this temperature is never reached with standard RG |
| City cycle | temperature at PF inlet of 500° C. reached in 100 sec. instead of 150 sec. with standard RG |
| | temperature at PF inlet of 550° C. reached in 105 sec. instead of 300 sec. with standard RG |
| | temperature at PF inlet of 600° C. reached in 150 sec. whereas this temperature is never reached with standard RG |

FIG. 2 shows a flow chart illustrating the operation of this regeneration assistance system.

This operation begins with a phase of determination of the regeneration frequency of the depollution means from the different items of information mentioned above.

This frequency f is subsequently compared by the supervisor, at 20, to threshold values.

If the frequency is lower than the threshold values, the regeneration strategy implements a level 1 strategy, at 21, associated with a strategy called level 2 strategy, at 22, until the end of the regeneration as determined at 23.

Conversely, if the frequency is higher than the threshold values, the supervisor implements a second regeneration strategy comprising a level 1 strategy, at 21, associated with a sequence alternating level 2 strategies and over-calibrated level 2 strategies, such as those designated by 24 and 25 on this Figure, until the end of the regeneration as detected at 26.

It is of course self-evident that different embodiments of this system can be envisioned, and that the depollution means can comprise a particle filter, such as, for example, a catalyzed particle filter or an NOx trap.

In addition, the fuel can also comprise an additive intended to be deposited, with the particle with which it is mixed, on the depollution means to facilitate their regeneration.

These depollution means can also be impregnated with an SCR formulation ensuring a CO/HC oxidation function in a standard manner.

Other means forming oxidation catalyst can be envisioned, and the depollution means and the means forming oxidation catalyst can be integrated into a single and same element, in particular on the same substrate.

By way of example, a particle filter integrating the oxidation function can be envisioned.

Similarly, an NOx trap integrating such an oxidation function can also be envisioned, whether it is additivized or not.

This oxidation and/or NOx trap function can be implemented, for example, by an additive mixed with the fuel.

The invention claimed is:

1. System for assisting the regeneration of depollution means integrated in an exhaust line of a motor vehicle diesel engine,
   in which the engine is associated with common rail supply means for the injection of fuel into the cylinders thereof, according to at least one post-injection, and adapted to implement, at constant torque, through modification of parameters for controlling the operation of the engine, wherein modified parameters control a modified operation mode of the engine during each regeneration phase, at least two regeneration strategies, among which
   a first regeneration strategy comprising strategies called level 1 strategies and level 2 strategies, and
   a second regeneration strategy comprising level 1 strategies and a sequence alternating level 2 strategies and over-calibrated level 2 strategies,
   making it possible to obtain different thermal levels in the exhaust line,
   wherein said system comprises means for determining the frequency of attempts at regeneration and activations of requests for regeneration of the depollution means and means for comparing this frequency with predetermined threshold values, to implement the first regeneration strategy for frequencies under the threshold values or the second strategy for frequencies above the threshold values.

2. System according to claim 1, wherein the depollution means comprise a particle filter.

3. System according to claim 2, wherein the particle filter is catalyzed.

4. System according to claim 1, wherein the depollution means comprise an NOx trap.

5. System according to claim 1, wherein the fuel comprises an additive intended to be deposited, with the particles with which it is mixed, on the depollution means to facilitate their regeneration.

6. System according to claim 1, wherein the depollution means are impregnated with an SCR formulation, ensuring a CO/HC oxidation function.

7. System according to claim 1, wherein the fuel comprises an additive forming NOx trap.

8. System according to claim 1, wherein the engine is associated with a turbo-compressor.

9. System according to claim 1, wherein the regeneration frequency of the depollution means is determined from the five last regeneration attempts thereof.

10. System according to claim 1, wherein the regeneration frequency is calculated based on an average distance travelled by the vehicle between two regenerations.

11. Method according to claim 1, wherein the regeneration frequency is calculated based on an average distance travelled by the vehicle between two regenerations.

12. Method for assisting the regeneration of depollution means integrated in an exhaust line of a motor vehicle diesel engine, in which the engine is associated with common rail supply means for the injection of fuel into the cylinders thereof, according to at least one post-injection, and adapted to implement, at constant torque, through modification of parameters for controlling the operation of the engine, wherein modified parameters control a modified operation mode of the engine during each regeneration phase, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies, making it possible to obtain different thermal levels in the exhaust line, said method comprising:

determining the frequency of attempts at regeneration and activations of requests for regeneration of the depollution means, comparing this frequency with predetermined threshold values, and implementing the first regeneration strategy for frequencies under the threshold values or the second strategy for frequencies above the threshold values.

13. Method according to claim 12, wherein the depollution means comprise a particle filter.

14. Method according to claim 13, wherein the particle filter is catalyzed.

15. Method according to claim 12, wherein the depollution means comprise an NOx trap.

16. Method according to claim 12, wherein the fuel comprises an additive intended to be deposited, with the particles with which it is mixed, on the depollution means to facilitate their regeneration.

17. Method according to claim 12, wherein the depollution means are impregnated with an SCR formulation, ensuring a CO/HC oxidation function.

18. Method according to claim 12, wherein the fuel comprises an additive forming NOx trap.

19. Method according to claim 12, wherein the engine is associated with a turbo-compressor.

20. Method according to claim 12, wherein the regeneration frequency of the depollution means is determined from the five last regeneration attempts thereof.

* * * * *